US005767999A

United States Patent [19]
Kayner

[11] Patent Number: 5,767,999
[45] Date of Patent: Jun. 16, 1998

[54] HOT-PLUGGABLE/INTERCHANGEABLE CIRCUIT MODULE AND UNIVERSAL GUIDE SYSTEM HAVING A STANDARD FORM FACTOR

[75] Inventor: Andrew H. Kayner, Kirkland, Wash.

[73] Assignee: Vixel Corporation, Broomfield, Colo.

[21] Appl. No.: 643,045

[22] Filed: May 2, 1996

[51] Int. Cl.$^6$ ................................................ H04B 10/00
[52] U.S. Cl. ............................................ 359/163; 359/152
[58] Field of Search .................................. 359/152, 163; 455/90; 361/722, 684–687, 728, 734, 736

[56] References Cited

U.S. PATENT DOCUMENTS

| | | | |
|---|---|---|---|
| 5,297,000 | 3/1994 | Freige et al. | 361/736 |
| 5,352,995 | 10/1994 | Mouissie | 333/181 |
| 5,397,247 | 3/1995 | Aoki et al. | 439/496 |
| 5,519,527 | 5/1996 | Panton | 359/163 |
| 5,561,727 | 10/1996 | Akita et al. | 359/163 |

FOREIGN PATENT DOCUMENTS

0554071   8/1993   European Pat. Off. .

*Primary Examiner*—Kinfe-Michael Negash
*Attorney, Agent, or Firm*—Irell & Manella LLP

[57] ABSTRACT

A module and module guide is disclosed which facilitates user access to electronic circuits such as serial transceiver circuits without need to remove the host system housing or to power down the system. The module and module guide system permits this easy access while maintaining electromagnetic emissions below standard specifications. The module and module guide system also permits hot pluggablity of the circuit into the host system by providing discharge paths for static electricity that might have built up on the outside of the module during handling. The module has a housing with cooling vents and and an EMI shield. The module has guide grooves in the sides of the housing, and at least two connectors, one being a straddle mount connector on the host side and typically serial connectors on the remote side. The module guide has a frame with window forming members, the window for receiving the module. The frame also has guide rails which are received by the guide grooves of the module and which guides the module to an interface with a host connector. The module guide also has guide door which is conductive and which is spring loaded. The door remains closed until insertion of a module to prevent leakage of EMI, and also maintains conductive contact with the module during and after insertion. The dust door is conductively coupled to system ground through EMI clips which are attached to the widow forming members and which are conductively coupled to the system chassis.

18 Claims, 8 Drawing Sheets

HOT-PLUGGABLE/INTERCHANGEABLE CIRCUIT MODULE AND UNIVERSAL GUIDE SYSTEM HAVING A STANDARD FORM FACTOR

BACKGROUND OF THE INVENTION

1. Field of the Invention

The present invention relates to an externally accessible, hot-pluggable communications circuit module and universal module guide system, and more particularly to interchangeable serial communications transceivers, employing transmission media such as fiber optics and copper wire at a wide range of frequencies and wavelengths, the transceiver circuits being housed in a standardized module housing and interfacing with a host system through a universal module guide; the module and module guide system meeting standard EMI specifications, providing discharge paths for ESD build-up during handling, and pin sequencing to prevent power surges during hot plugging.

2. Art Background

Many computer and telecommunications systems employ full duplex serial data communication between various components, boards and subsystems of those systems. For example, computer CPUs often must communicate with peripheral devices such as other CPUs, disc drives, tape drives and other input/output devices. In telephone systems, analog voice signals are converted to digital format and bit-serially transmitted through telephone switches to remote receivers. It is often desirable to transmit the data between a source and a receiver using light generated by a laser and transmitted through an optical fiber. The benefits achieved by transmitting the data optically include electrical isolation between transmitter and receiver, as well as the ability to transmit the data at a greater distance by avoiding the electrical loss typically associated with transmission over copper wire.

A number of protocols define the conversion of electrical signals to optical signals and transmission of those optical signals in full duplex format, including the ANSI Fibre Channel (FC) protocol. The FC protocol is typically implemented using a transceiver module at both ends of a communications link, each transceiver module containing a laser transmitter circuit capable of converting electrical signals to optical signals as well as an optical receiver capable of converting received optical signals back into electrical signals. The optical transceiver may be configured to generate and receive optical signals having a wavelength of 780 nanometers nominally to achieve a minimum transmission distance of about 500 meters. The optical transceiver can also be designed to generate and receive optical signals having a longer wavelength of 1,300 nanometers, to achieve a minimum transmission distance of about 10 kilometers. Moreover, the transceiver module can be designed to transmit and receive at various data rates, including 266 Megabaud, 531 Megabaud and 1063 Megabaud or faster. Finally, the transceiver module may be employed to convert the transmission media from internal system electrical signals to external system signals for use with copper cables.

Numerous transceiver modules have been made available in the commercial market which comply with the FC standard. IBM produces the OLC 266, which operates at 266 Megaband as well as the GLM 1063 which runs at 1 Gigabaud. ELDEC/MODULINC provides the MIM 266, the MIM 531 and MIM 1063 as OLC/GLM interchangeable and interoperable products. The drawback to all of these transceiver modules is the fact that if the module requires replacement either due to component failure, the desire to change (i.e., upgrade) the data rate, the desire to change the transmission range of the transceiver or the desire to change the transmission medium, the entire system has to be powered down so that the system housing can be opened and the transceiver module removed from its socket within the system. Requiring the user to power down the system and open the system housing every time it is desirable to change the transceiver module conflicts with customers' desire for high system availability. Specifically, it is not desirable to power down some systems such as disk drives or telephone switching systems.

Thus, it is highly desirable to provide a transceiver module which is capable of being removed from the user system without requiring a user to open the system housing to obtain access to the transceiver or requiring the system to be powered down during the replacement process. It is also highly desirable to provide a module and universal guide system by which all transceiver modules are built to meet the same form factor regardless of their protocol, conversion frequency, wavelength of operation, or transmission medium. The ease of access and minimal impact on system operation offered by such a guide system should not, however, compromise the system's ability to meet the specified limits of electromagnetic emissions or susceptibility to electrostatic discharge. Moreover, such a guide system must maintain suitable shielding of electromagnetic radiation. Finally, because of its hot pluggability, such a guide system must be designed to shunt static electricity from the module prior to insertion into the user system to avoid damage due to electrostatic discharge, as well as to ensure that no circuitry-damaging current surges occur upon insertion. Shielding to minimize the emission of electromagnetic radiation would be particularly critical for such a transceiver module based on the higher frequencies of operation that are currently being attained by such transceiver modules, as well as the fact that they would be accessed through openings in the host system's housing while the host system is still operating.

SUMMARY OF THE INVENTION

The present invention is a module and universal module guide system which together provide for hot-pluggable interchangeability of circuits such as transceivers via easy access external to any host system employing the invention. The module and module guide system of the present invention comprises a circuit module which houses a circuit which is, in one embodiment, a transceiver circuit (i.e. media converter) and a universal module guide which receives the module and guides it to a mating with a host connector. The universal guide is designed to receive modules of a standard size and form factor, independent of the desired frequency of operation, transmission medium, transmission protocol or optical wavelength employed by the transceiver circuits housed within the modules. The universal guide acts as a means to guide the module, and thus the circuit housed therein, to a mating with a host system connector, and to provide a retention force to the module until a user releases the module from the universal guide for removal from the host system. The module contains a transceiver circuit that performs a signal conversion, has a specified transmission frequency, transmits and receives the serial data using either an optical transmission medium or an electrical transmission medium (i.e. copper wire). The preferred embodiment of the module has straddle-mount plug for electronically coupling the signals of the module circuit PC board to a recepticle of the host system, and has serial connectors (either optical or electronic), in the case where the module circuit is a serial transceiver, for interface to another remote transceiver.

The module guide is a rectangular frame preferably made of glass-filled, flame retardant nylon which is capable of being wave soldered. The front end of the converter guide forms a rectangular window for receiving the module. A spring loaded dust door, preferably made of a dye-cast zinc is designed to close the opening to contain EMI when no module currently occupies the guide system. As the module is inserted through the window of the module guide, the dust door swings up and open against the force of the spring to permit insertion.

At the end opposite to the dust door, the universal module guide has an opening for accommodating a connector of the host. Guide rails are provided on the inside edges of the universal module guide, which fit into guide grooves along the sides of the module and serve to guide the mating of the plug of the module into the host recepticle mounted at the end of the universal module guide.

Once the straddle mount plug of the module has been mated with the host system recepticle mounted in the end of the universal guide, tension clips located at the end of the module opposite to the connector are seated into tension clip stops at the dust door end of the universal module guide. To remove the module from the universal guide, the tension clips on the module are squeezed with the thumb and forefinger to disengage them from the clip stops on the universal guide. The module can then be pulled with sufficient force to disengage the plug connector of the module from the host recepticle located at the end of the universal guide opposite to the window. Once the module has been removed completely from the universal guide, the dust door swings closed as the result of force exerted by the spring.

The universal guide can be mounted such that the long dimension of its window is parallel with a PC board, or it can be tipped up on the short dimension of its window to create a vertical connector orientation. The vertical orientation provides the ability to mount several universal guides in close proximity, of course, for the vertical orientation, the host edge connectors must also be mounted in a vertical orientation. The universal guide has numerous PC board locator pins and retention feet to accomplish either mounting orientation. Moreover, the footprint of the module guide retention feet and locator pins are asymmetric, such that universal guides may be mounted on opposite surfaces of a PC board.

The long dimension members of the insertion window of the universal guide are trimmed by an EMI clip. These EMI clips are designed to maintain electrical contact with the system chassis through a bulkhead or frame surrounding the window, as well as with the dust door at top and bottom contact points when it is closed. The EMI clip (and thus the chassis) continues to maintain contact with the top of the dust door as the door swings open to receive the module. As the module is inserted and the door swings upward, the reaction force of the spring maintains the bottom part of the dust door with the top portion of an EMI shield which covers the surface of both the top and bottom surface of the module housing. The bottom EMI clip serves to contact the bottom portion of the EMI shield covering the bottom surface of the module housing. Thus, the outside surfaces of the module typically handled by a user are protected by a conductor shield which is electrically connected via the dust door and the EMI clips to the system chassis and thus to ground. This serves to contain electromagnetic interference as well as to provide a path to ground for electrostatic build up on the module surface. When closed, the dust door serves the purpose of preventing electromagnetic radiation from being emitted through the front of the system chassis when there is no media converter module inserted into the universal guide, and maintaining air flow balance.

The EMI shield and the module housing have cooling vents in the top and bottom surfaces to permit air flow through the media converter module to cool the media conversion circuitry. The EMI shield also has a strip which couples the top and bottom portions and which separates transmit and receive fiber optic receptacles housing the optical transmit and receive elements.

To further support hot-pluggability, the connector of the module has ESD ears to provide a first contact between the converter module and the host connector. Moreover, the pins of the straddle mount plug connector which couple the signals from the module to the host system recepticle are sequenced such that the ESD ears to recepticles is contacted first, ground and data signals are contacted second, and power supply pins are contacted third. Finally, current limiting circuitry is employed to ramp the converter power up slowly as the power supply connections are made to limit any surges in supply current created thereby.

It is therefore an objective of the present inventio to provide a circuit module and module guide system which faciltates the easy interchangeability of circuits housed in the module without need for powering down or opening the housing of the host system.

It is further an objective of the invention to provide a serial communications transceiver circuit which is capable of being accessed and replaced from outside a host system.

It is still further an objective of the invention to provide a serial communications transceiver circuit wherein the transceiver circuit (i.e., media converter) can be plugged into, or unplugged from, the host system without need to power down the entire host system.

It is still further an objective of the invention to provide a serial communications transceiver circuit wherein the circuit is housed in a module having a standard form factor, and which is designed to fit into a universal module guide residing in the host system, the guide for receiving and facilitating the insertion of the media converter module into the host system, the module containing serial transceiver circuits capable of converting transmitted and received electrical signals to signals of various transmission media in accordance with any number of established media conversion standards and at a wide range of transmission frequencies.

It is still further an objective of the present invention to provide a serial communications transceiver circuit which, although accessible from outside of the host system without need to remove the system housing or to power-down the host system, still maintains protection against EMI in accordance with specified standards.

It is still further an objective of the invention to protect the host system from disruption or destruction due to the buildup of ESD on the media converter module prior to its insertion into the system by a user.

It is yet another objective of the invention to sequence the electronic connections of the module to the host as it is being inserted and coupled to the host connector to prevent destruction of transceiver circuitry and/or host circuitry due to ESD.

It is yet another objective of the present invention to provide current limiting circuitry to prevent a surge in supply current as the media converter module is plugged into the edge connector of the host during hot insertion.

These objectives and others will become clear in view of the following detailed description of the invention.

BRIEF DESCRIPTION OF THE DRAWINGS

FIG. 3c is a cross-sectional view of the universal module guide from line A–A'.

FIG. 4 illustrates an EMI clip of the present invention.

FIG. 5a illustrates a side view of the EMI clip of FIG. 4.

FIG. 5b illustrates a magnified view of the EMI clip retention fingers and the converter-to-dust or contact fingers of the EMI clip of FIG. 4.

FIG. 5c illustrates the EMI clip retention finger prior to being crimped to the universal module guide window.

FIG. 5d illustrates a magnified view of the bulkhead contact finger and bulkhead contact retention finger of the EMI clip of FIG. 4 and FIG. 5a.

FIG. 6a shows the front surface of the dust door of the universal module guide of the present invention.

FIG. 6b illustrates the rear view of the dust door of FIG. 6a.

FIG. 6c illustrates a cross-sectional view of the dust door along the line A—A as illustrated in 6d.

FIG. 7 illustrates isolated view of the retention spring of the dust door of the present invention.

DETAILED DESCRIPTION OF THE INVENTION

Figure 1A:
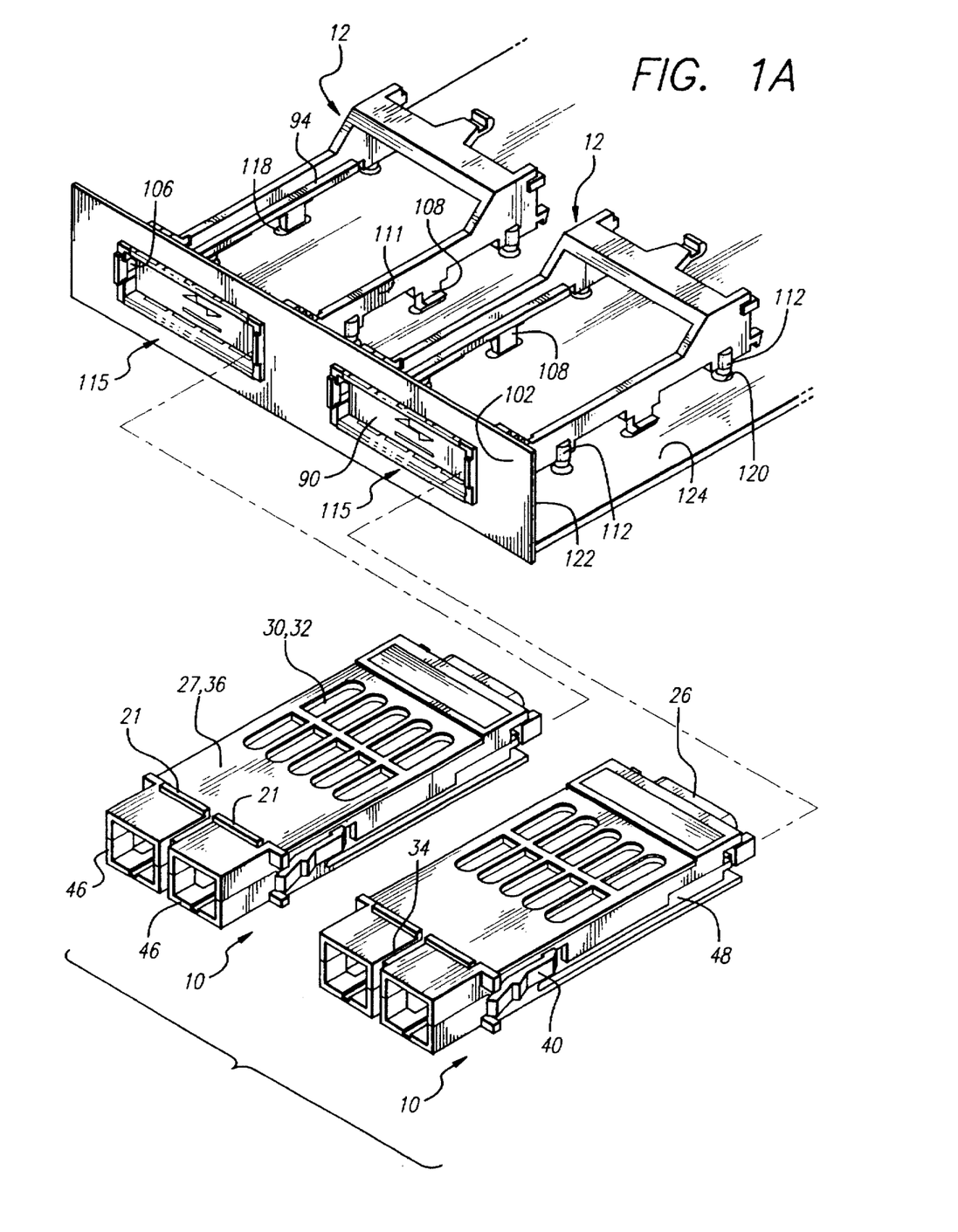
FIG. 1a illustrates the implementation of the present invention as mounted on a PC board such as a PCI card or an S-Bus card.

FIG. 1a illustrates the hot-pluggable media convertor module and module guide system as implemented in the context of a PC board such as a PCI card or an S-Bus card. Universal module guides 12 are flat mounted on the PC board 124 using PC board locator pins 112 and PC board retention feet 108. The universal module guides 112 are mounted at the edge of the PC board 124 such that the windows 115 formed by the frames 111 of the universal guides 12 can be framed by bulkhead 122, which is in turn mounted at the edge of PC board 124. Bulkhead 122 is also conductively coupled to the system chassis.

The circuit module 10 can be inserted through window 115 and dust door 90 of a universal guide 12, causing dust door 90 to swing backward to permit the guide grooves 48 of module 10 to engage the guide rails 94 of the universal module guide 12. The circuit modules 10 slide all the way into the universal guides 12 until retention clips 40 become seated into retention clip stops 106 of the universal guide 12. At that point, chassis stops 21 will be flush with the bulkhead 122 and straddle mount connector 26 will be seated with right angle host connectors 23 (not shown) located within the end of universal guide 12.

Figure 1B:
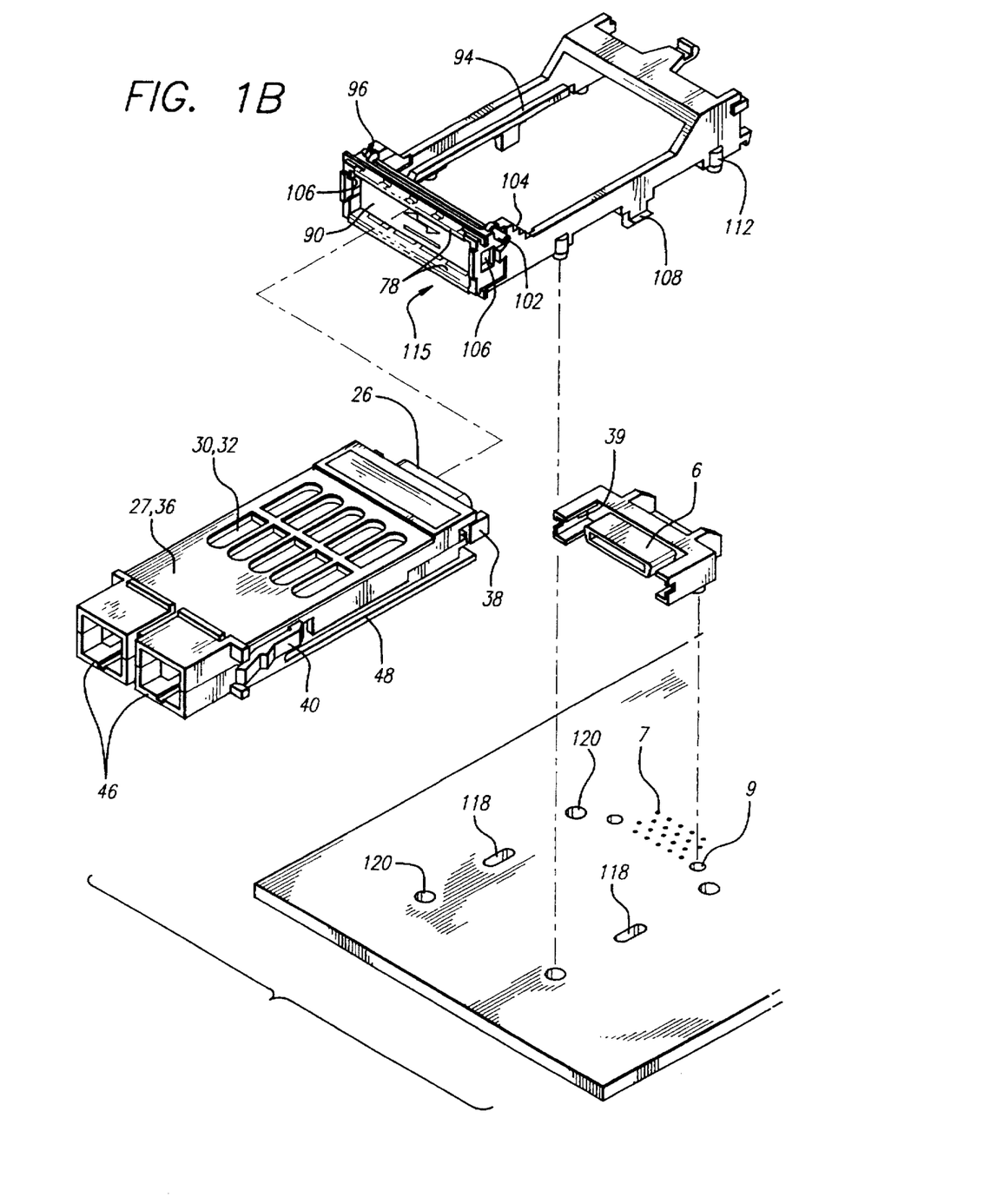
FIG. 1b is an exploded view of FIG. 1a, including a right-angle host edge connector.

FIG. 1b illustrates an exploded view of the media converter module 10 as if it is aligned with the universal module guide 12. It also illustrates the location of the universal module guide 121 on PC board 8, and the location of right angle host connector 6. Host connector 6 is located within the end of universal guide 12 such that the straddle mount connector 26 of converter module 10 is seated with host connector 6 when retention clips 40 of converter module 10 become seated in clip stops 106 of the universal guide 12. ESD ears 38 of straddle mount connector 26 are received by ESD receptacles 39 of host connector 6.

Figure 2:
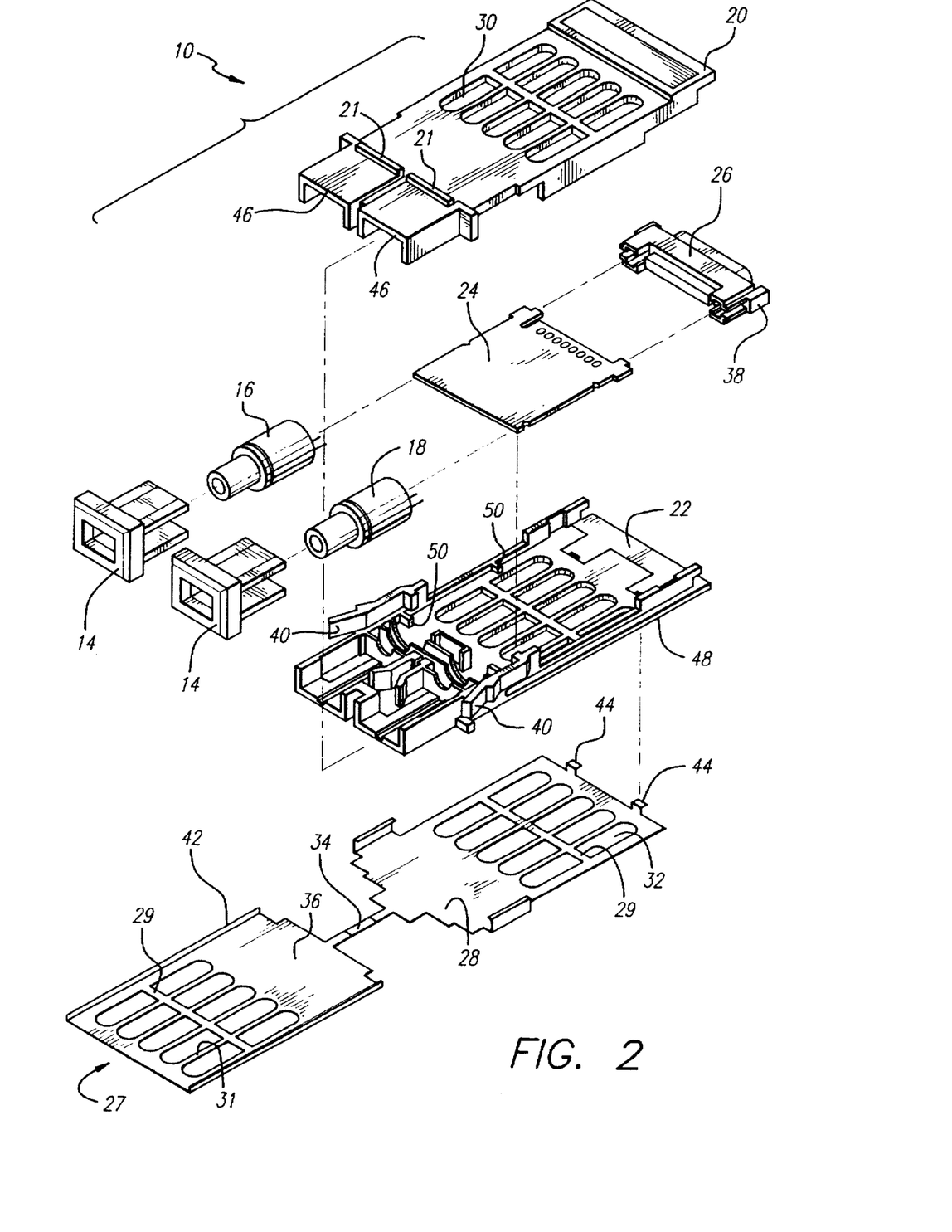
FIG. 2 is an exploded view of the circuit module of the present invention.

FIG. 2 illustrates an exploded view of a circuit module of the present invention. The circuit module consists of a module housing having a bottom half 22 and a top half 20. The module housing contains cooling vents 30 in both the bottom 22 and top 20 halves. PC board 24 is located within the module housing and, in the preferred embodiment of the invention, is a transceiver circuit having the electronics necessary to perform the conversion of data from the host system into serial transmit signals to be transmitted via the medium of choice and at the frequency of choice. The transceiver circuit on PC board 24 also converts serial data received via the medium of choice and at the frequency of choice into electronic signals to be input into the host system. PC board 24 is coupled to the pins of the straddle mount plug connector 26. Transmit device 16 and receiver device 18 are located within SC fiber optic receptacles 46 and are both electronically interfaced to PC board 24. EMI shield 27 comprises a bottom half 28 and a top half 36. The bottom portion 28 of EMI shield 27 is coupled to the bottom portion 22 of the converter housing using shield retention tab 44 and shield retention clips 42. Both the top 36 and bottom 28 portions of EMI shield 27 have shield cooling vents 32 which are aligned with housing cooling vents 30. Top portion 36 of EMI shield 27 is likewise attached to top portion 20 of the convertor housing and EMI shield connector strip 34 runs between SC fiber optic receptacles 46.

Shield connector strip 34 maintains electrical continuity between top portion 28 and bottom portion 36 of EMI shield 27, as well as to provide additional shielding between the fiber optic receptacles 46. EMI strip 34 serves to cut the openings for the fiber optic connectors in half, thereby reducing the area from which electromagnetic radiation can leak from the system housing.

Figure 3A:
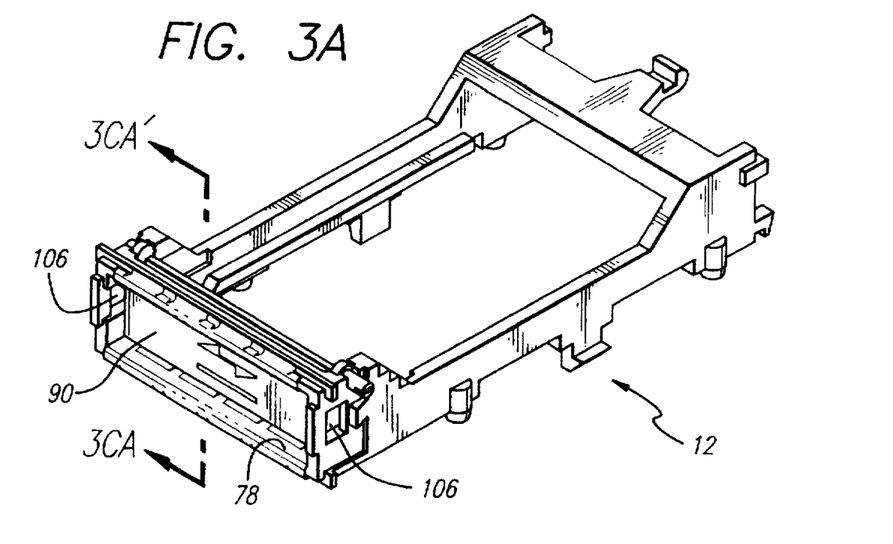
FIG. 3a illustrates the universal module guide of the present invention indicating a cross section A–A'.
Figure 3B:
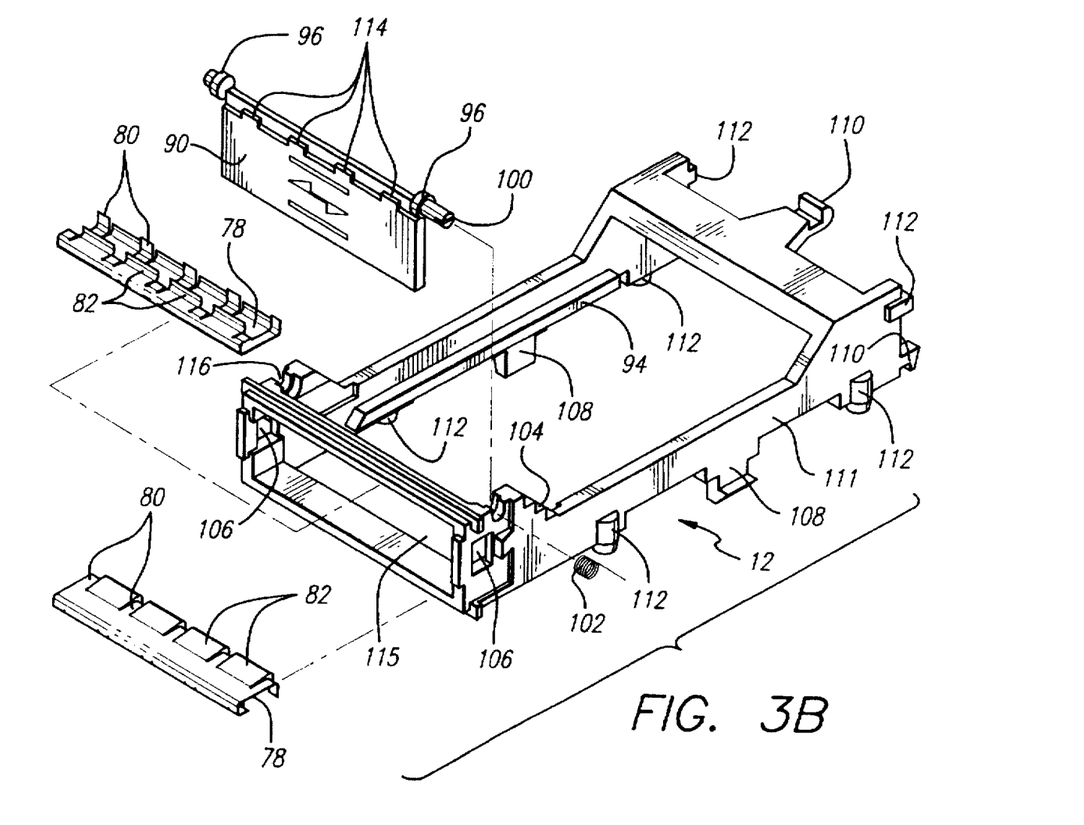
FIG. 3b is an exploded view of the universal module guide of the present invention.
Figures 3C, 4, 5A, 5B, 5C, 5D:
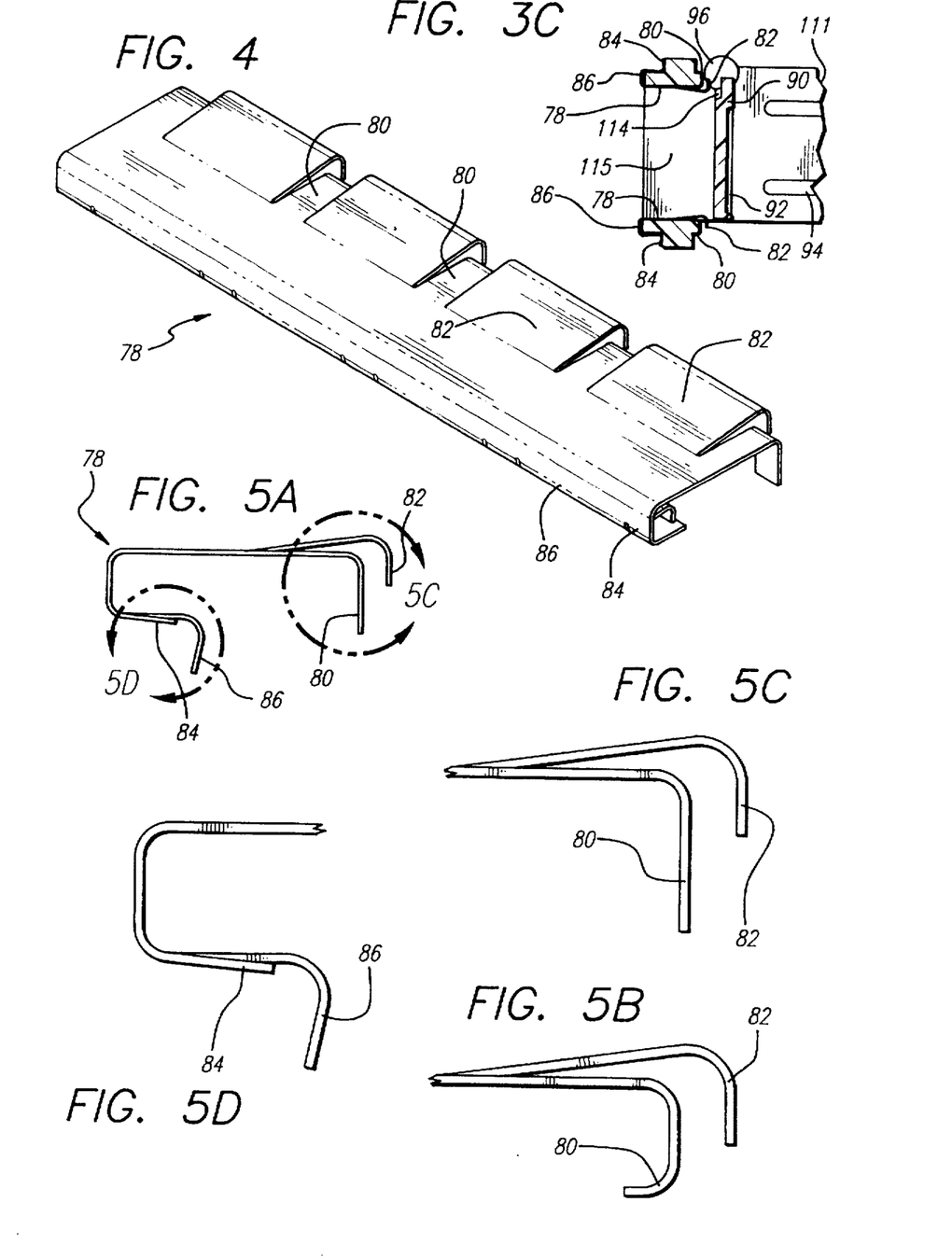

FIGS. 3a, 3b and 3c illustrate the universal module guide 12 of the present invention. FIG. 3b shows an exploded view of the universal module guide 12, which comprises a frame 111 made preferably of a 30% glass filled nylon. Frame 111 forms a window 115 at the front end of the universal module guide 12. Window 115 is rectangular in shape. Attached to the upper and lower longer-dimensioned members of frame 111 which form window 115 are an upper and lower EMI clip 78. Each EMI clip 78 has on its inner side converter-to-dust door contact fingers 82 and EMI clip retention fingers 80. On the outer edge of the EMI clips 78 are bulkhead contact fingers 84 and bulkhead contact retention fingers 86.

The cross-sectional view of FIG. 3c well illustrates the attachment of the EMI clips 78 onto the upper and lower members of frame 111 forming window 115. It can be seen from FIG. 3c that converter-to-dust door contact finger 82 maintains contact with EMI shield contact rib 114 of dust door 90. EMI clip retention finger 80 is crimped around the upper member of frame 111 to hold the EMI clip 78 to the member. The EMI clip 78 attached to the lower member of frame 111 forming window 115 has its converter-to-dust door contact finger 82 in contact with the free end of dust door 92. Thus, when no circuit module is inserted inside of universal guide 12, dust door 90 maintains contact with both the upper and lower EMI clips 78. When a circuit module 10 is inserted into universal guide 12, dust door 90 rotates about pivots 96 and dust door 90 continues to make contact with upper EMI clip 78 by way of its EMI shield contact rib.

On the outer edges of EMI clip 78, both bulkhead contact retention fingers 84 and bulkhead contact fingers 86 maintain electrical contact with a metal bulkhead or system chassis. Bulkhead contact retention finger 84 holds the EMI clips 78 to the upper and lower members. Bulkhead contact fingers 86 are bent in such a manner so as to maintain pressure against the metal bulkhead or chassis as it frames window 115. A bulk head 122 is illustrated in FIG. 1 as it frames windows of universal guides 12.

FIG. 4 illustrates a magnified view of an EMI clip 78. FIG. 5a illustrates a magnified side view of EMI clip 78. FIG. 5b illustrates a further enlargement of the converter-to-dust door contact fingers 82 and EMI clip retention finger 80. Retention finger 80 is illustrated as having been crimped to hold the EMI clip to the framing member of frame 111 forming window 115 and universal guide 12. FIG. 5d is a further enlargement of bulkhead contact retention finger 84 and bulkhead contact finger 86. It can be seen from figure 5d that these fingers are located at an angle in order to increase the ability of the fingers to maintain contact with the bulkhead 122 of FIG. 1a.

FIGS. 6a through 6d illustrate the dust door 90 of universal guide 12. Dust door 90 is preferably manufactured as a dye-cast zinc and which has pivots 96 that are designed to fit into pivot mounts 116 in frame 111 of universal guide 12. One of the pivots 96 is extended to include spring slot 100. Spring 102 as shown on FIG. 3b is inserted into slot 100 and further retained by spring retention tabs 104. As the door is rotated about pivots 96 during insertion of a media converter module 10, spring 102 creates force tending to return dust door 90 to its closed and resting position once the circuit module 10 is removed. The force created by spring 100 is not only helpful in that it maintains the dust door 90 in a closed position when no module is inserted, it also serves to maintain contact between dust door 90 and the EMI dust door contact strips 31 which serve to define shield cooling vents 32 in the top half 36 of EMI shield 27. Contact between dust door and EMI dust door contact strips 31 is accomplished by EMI shield contact ribs 14 forming part of dust door 90. Ribs 114 are in alignment with strips 31.

On the front surface 93 of dust door 90 a logo 88 can be engraved. On the back surface 92 of dust door 90, it can be seen from FIG. 6d that a considerable amount of material has been eliminated to lower the expense of manufacturing the dust door as well as to make it lighter.

Figures 6A, 6B, 6C, 7:
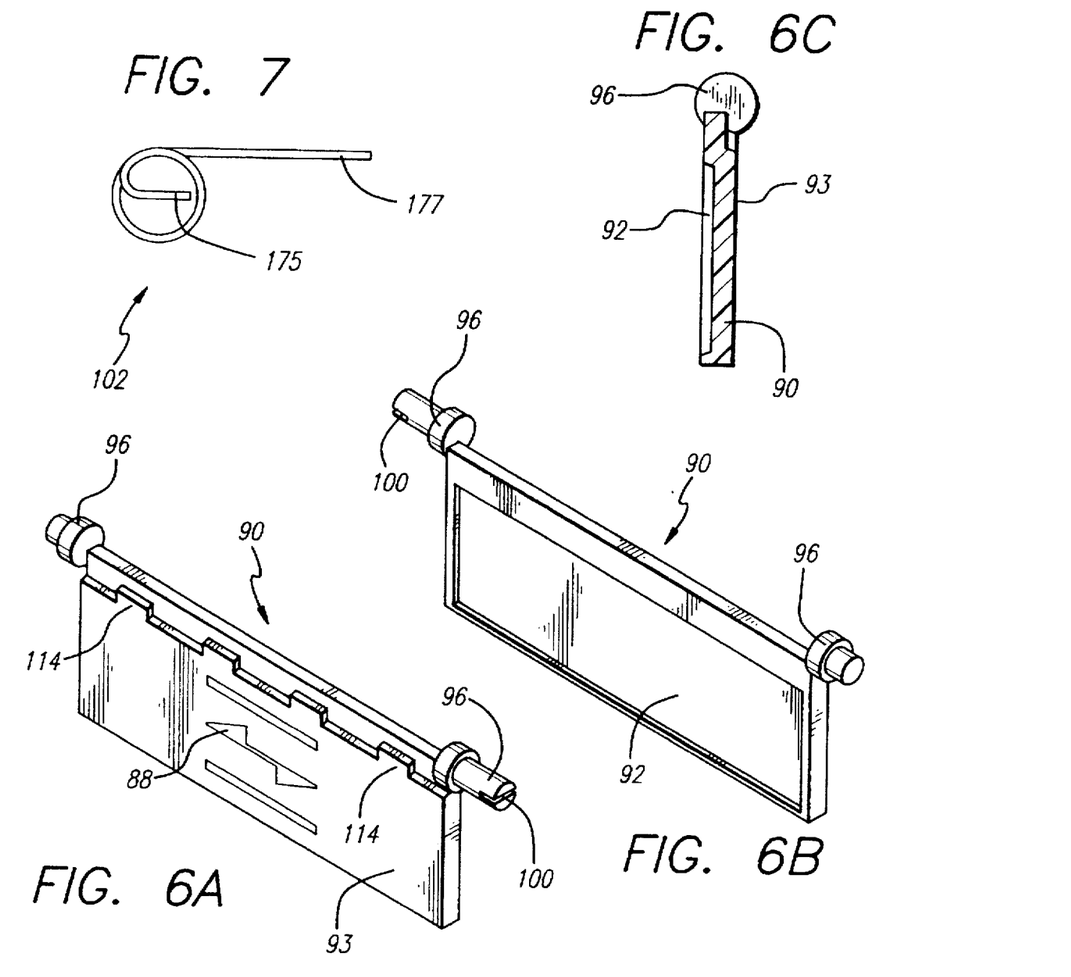
Figure 6D:
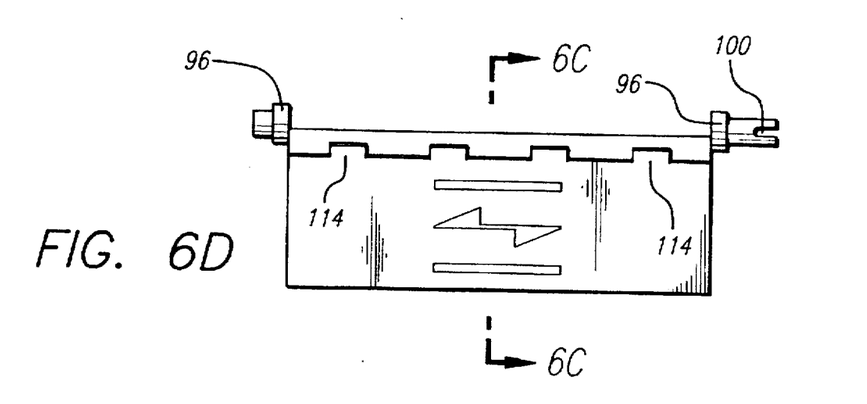
FIG. 6d illustrates the dust door of the present invention from the front.

As illustrated by the cross-sectional view of FIG. 6c, the pivot point of dust door 90 is not centered on pivot 96, but rather is off-center in order to ensure that the door will not extend beyond the top of the window frame of universal guide 12.

FIG. 7 illustrates close up view of spring 102. Spring member 175 is inserted into spring slot 100 of universal guide 12. Spring arm 177 is inserted into spring retention tabs 104. This spring is preferably constructed of stainless steel, it has a total of 3.25 coils, and the direction of the helix is right-handed.

Figure 8:
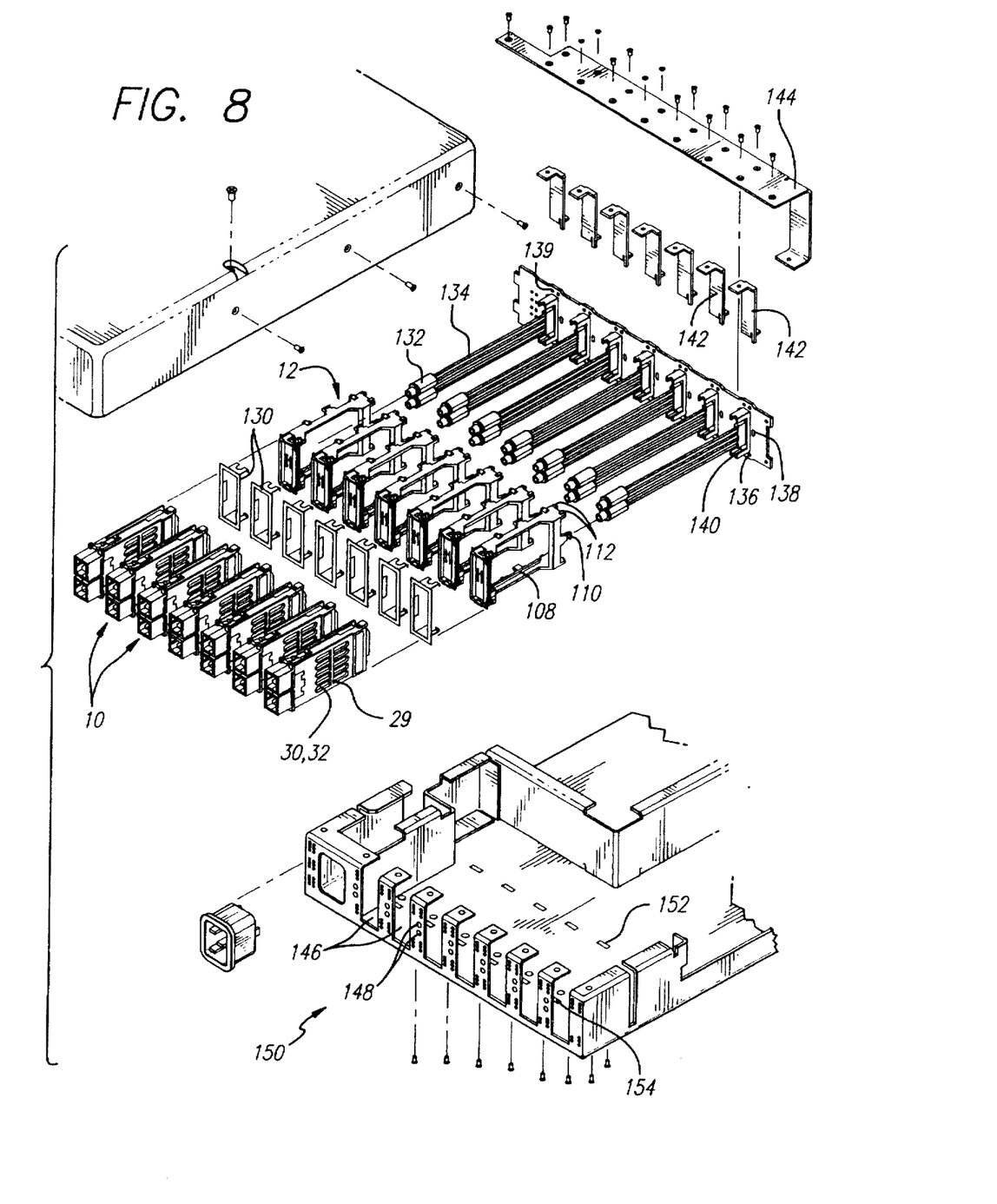
FIG. 8 illustrates the circuit module and universal module guide of the present invention as implemented with a vertical orientation to be used in a system such as a hub.

FIG. 8 illustrates the implementation of circuit modules 10 along with universal guides 12 in a hub application which requires that the universal guides 12 be mounted on their sides. Vertical connectors are mounted on PC board 136, universal guides 12 are then mounted on PC board 136 using retention feet 110 inserted into retention slots 138 and PC board locating pins 112 which are inserted into location holes 139 of PC board 136. Universal guide retention clips 130 are used to fix universal guides 12 to the chassis 150 at guide system chassis slots 146. Retention feet 108 of universal guides 12 can be used to further anchor guides 12 to the chassis. PC board 139 is anchored into chassis 150 using PC board retention slots 152. Airflow diverters 142 are fixed in chassis 150 at airflow diverter locator slots 154 and are aligned with EMI airflow strips 29 formed between the cooling vents 30, 32 such that air flowing through one side of the airflow diverters 142 will flow into a first row of the cooling vents and will be forced to flow out of the second row of cooling vents. This serves to increase air circulation and cooling efficiency. Airflow diverters 142 can be held in place using airflow diverter clamp 144.

Figure 9:
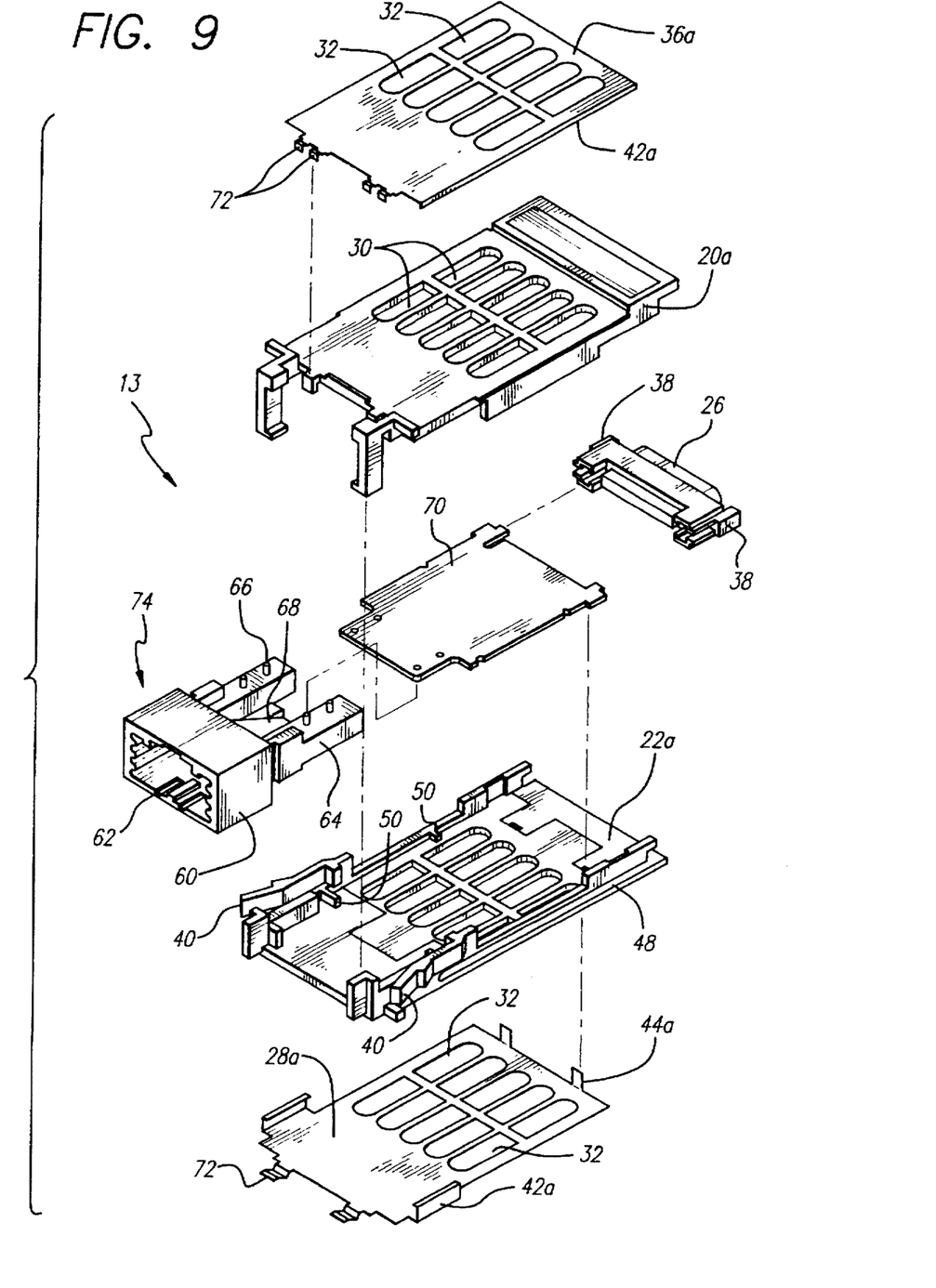
FIG. 9 illustrates a media converter module of the present invention wherein the transmission medium is copper wire rather than optical fiber.

FIG. 9 illustrates a second embodiment of a circuit module 11 which houses a transceiver circuit used in systems that do not require optical transmission but rather use cooper wire as the transmission medium. It can be seen from a comparison between FIG. 9 and FIG. 2 that module 11 is constructed quite similarly to module 10 except that a much different transceiver connector 74 is prevented for interface to the outside world but not used for optical interface using an SC connector. Transceiver interface 74 is coupled to PC board 70 using PC locator leg 64 and PC board locator pin 66. Copper pins 68 are spring-loaded and make contact with metalized traces on PC board 70. Metal shield 60 surrounds plug/shield contact 62 to help prevent against an electromagnetic leakage.

Those of skill in the art will recognize that the benefit of the converter module/universal guide system is that any circuit can be housed in the module for which interchangeability and hot pluggability is desired. Moreover, with respect to particular types of circuits, such as transceivers, characteristics such as the physical interface employed (e.g. optical or copper), the media conversion protocols, the actual number of pins which interface between the media conversion circuitry and the host system, can all vary because of the standardized form factor and the various features of the universal guide 12.

What is claimed is:

1. An apparatus for providing interchangeability of a circuit within a host system, said apparatus comprising:
    a circuit module comprising:
        a housing, said housing enclosing an electronic circuit, said electronic circuit coupled to at least two connectors, said at least two connectors accessible through said housing, said housing having guide grooves and cooling vents, and wherein said housing is mechanically coupled to a conductive shield;
    a module guide comprising:
        a frame, said frame having four members that form a window, said window having dimensions substantially the same as said circuit module, said frame having guide rails, said frame further comprising a spring loaded door, said door capable of pivoting about a top one of said window forming members;

a host connector, said host connector electrically coupled to said host system, said host connector capable of being mechanically and electrically coupled to one or more of said at least two connectors of said module, said host connector located at an end of said frame opposite said door; and wherein said door pivots away from a bottom one of said window forming members and said guide rails of said module engage said guide grooves of said module to guide said one or more of said at least one connector of said module to a mechanical and electrical coupling with said host connector.

2. The apparatus of claim 1 wherein said door comprises a conductive material, said door conductively coupled to ground of said host system.

3. The apparatus of claim 2 wherein said door engages in conductive contact with said conductive shield whenever said module is being inserted into said module guide.

4. The apparatus of claim 3 wherein said door is coupled to ground of said host system through EMI clips fastened to said window forming members of said module guide.

5. The apparatus of claim 4 wherein said host system is enclosed in a housing comprising a chassis, and wherein said door is coupled to ground through said EMI clips coupled to said chassis.

6. The apparatus of claim 2 wherein said door comprises die-cast zinc.

7. The apparatus of claim 1 wherein said module guide comprises glass-filled nylon.

8. The apparatus of claim 1 wherein said circuit in said module is a serial transceiver circuit, and wherein a first one of said at least two connectors is coupled to a serial transmit circuit of said transceiver, and a second one of said at least two connectors is coupled to a serial receive circuit of said transceiver.

9. The apparatus of claim 8 wherein said serial transmit and receive circuits transmit and receive fiber optic signals.

10. The apparatus of claim 8 wherein said one or more of said at least two connectors of said module comprises ESD ears, said ESD ears designed to be received by ESD receptacles of said host system connector.

11. The apparatus of claim 10 wherein said one or more of said at least two connectors of said module is a straddle-mount plug connector.

12. The apparatus of claim 10 wherein said ESD ears couple ground of said transceiver circuit to ground of said host system through said ESD receptacles of said host system connector prior to coupling said circuit of said module to power of said host system.

13. The apparatus of claim 10 wherein said transceiver operates in accordance with ANSI Fibre Channel protocol.

14. The apparatus of claim 13 wherein said transceiver circuit is capable of transmitting data at a rate of at least one Gigabaud.

15. The apparatus of claim 8 wherein said host connector is a right-angle recepticle.

16. The apparatus of claim 8 wherein said host connector is a vertical mount receptacle.

17. The apparatus of claim 12 wherein a current limiting circuit is employed to prevent a surge of current when said supplies are coupled to power of said host system.

18. The apparatus of claim 12 wherein signal inputs and outputs of said transceiver circuit are electrically coupled to said host system connector after said ESD ears are coupled to said ESD ears and before said transceiver circuit is coupled to power of said host system.

* * * * *